INVENTOR.
GEORGE C. PEARCE
HIS ATTORNEYS

United States Patent Office 2,765,728
Patented Oct. 9, 1956

2,765,728

COOKING UTENSIL INCLUDING A POROUS METAL COOKING SURFACE

George C. Pearce, Dayton, Ohio, assignor to General Motors Corporation, Detroit, Mich., a corporation of Delaware Application June 16, 1952, Serial No. 293,830

2 Claims. (Cl. 99—372)

This invention relates to cooking utensils and is particularly concerned with skillets, griddles and similar utensils including porous metal cooking surfaces therein.

It is therefore the main object of the invention to provide a cooking utensil of the type selected from skillets, griddles and the like wherein the cooking surface is formed wholly or in part from porous metal wherein said porous metal surface may be impregnated with a fat or grease so that food cooked thereon is prevented from sticking to the surface. In this manner, a single impregnation of the cooking surface will be sufficient for a long period of service so that one application of grease is all that is required over an extended period of time.

It is a further object of the invention to provide a cooking utensil, such as a skillet, griddle and the like, with the cooking surface made at least in part of porous metal wherein said porous metal is taken from the class consisting of aluminum and its alloys, iron and alloys thereof, copper-nickel alloys or copper and alloys thereof, etc.

Further objects and advantages of the present invention will be apparent from the following description, reference being had to the accompanying drawing, wherein preferred embodiments of the present invention are clearly shown.

In the frying of foods, it is necessary to provide grease or fat in the utensil for preventing the food from sticking to the surface thereof during the frying operation. This is particularly necessary when making waffles, griddle cakes and the like wherein it is necessary to apply fat upon each frying operation. In many cases, too much fat is used, thereby making the food of a greasy character, while in other instances too little fat is applied permitting the food to stick to the frying surface.

This invention is directed to a new article of manufacture which obviates these past difficulties and which permits the impregnation of the frying surface with fat whereby at no time does the surface have too much fat present while at all times there is a thin covering of fat present.

Figure 1:
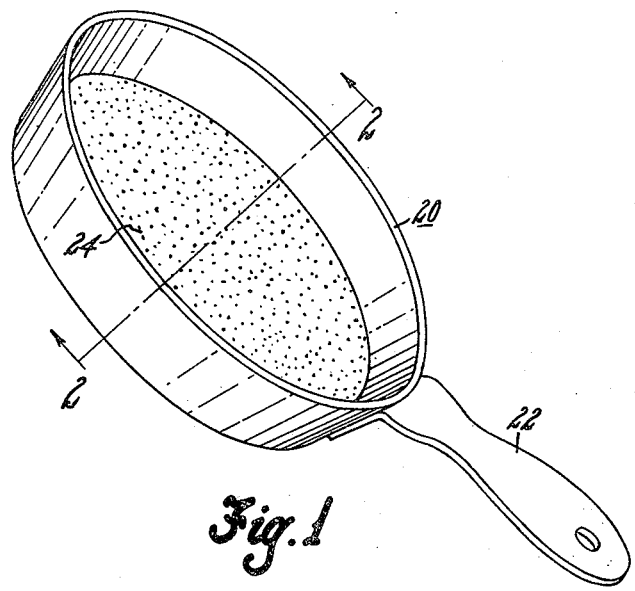
Fig. 1 is a perspective view of the skillet or frying pan.
Figure 2:
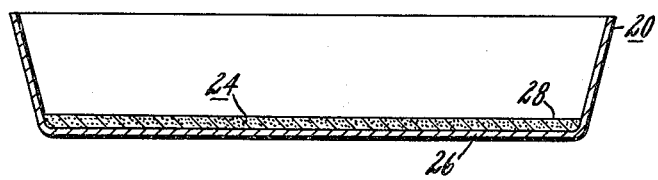
Fig. 2 is a view in section taken on line 2—2 of Fig. 1, showing the porous metal portion of the pan.

Referring to the drawing, Fig. 1 depicts a frying pan or skillet 20 having a handle 22 and including a frying surface at the bottom thereof noted at 24. The surface 24 is preferably formed of the steel or iron bottom 26 of the frying pan having contiguous therewith and sometimes bonded thereto a porous metal layer 28. In this manner, the pan includes an impervious bottom, yet has a porous layer capable of retaining a predetermined quantity of grease therein.

Porous metal layer 28 is preferably in the order of from .125" to .25" thick, although this thickness may vary in either direction according to the specific purpose to which the utensil is to be put. In general, however, a layer of porous metal of about .160" will retain sufficient grease to properly condition the cooking surface for frying over an extended period of time.

Figure 3:
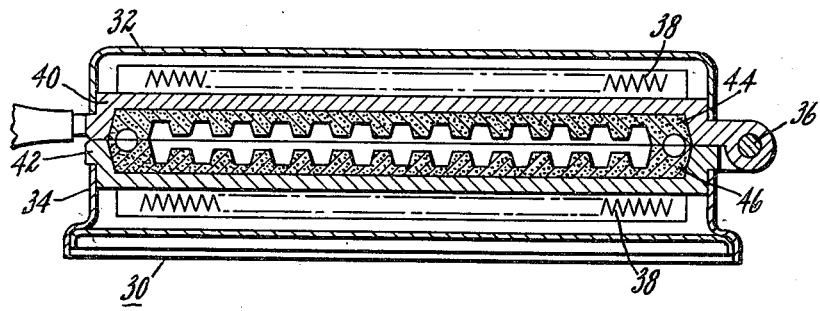
Fig. 3 is a view in section of a waffle iron showing the porous metal portion at the grid portion thereof.

The porous metal layer may be also used in a waffle iron, for example, as is shown at 30 in Fig. 3. In this instance, the iron includes an upper member 32 and a lower member 34 hinged together at 36, each member including therein heating elements 38. The two members 32 and 34 are closed by like metal plates 40 and 42, respectively, which are recessed to receive porous metal grid members 44 and 46, respectively. These grid members should be dimensioned so that the thinnest section of the porous metal is preferably in the order of about .125" thick. These grids 44 and 46 may be permanently bonded to the plates 40 and 42 or they may be removably positioned therein by catches (not shown).

In all instances, the porous metal part may be made by distributing a uniform, substantially loose layer of metal powder particles having a mesh size preferably ranging between 100 to 200 mesh in a layer sufficiently thick to ultimately produce the desired thickness of the layer, as will be explained hereinafter. This powder may be spread directly on the bottom of the skillet which has preferably been flash-copper-plated and may then be sintered under suitable conditions of time, temperature and atmosphere for causing the metal powder particles to bond together and to simultaneously bond to the surface of the iron or steel backing member.

This sintered layer may then be compressed hot or cold to reduce the porosity thereof and likewise reduce the thickness. In this instance, it is therefore necessary by trial and error to decide on the proper thickness of the loose powder layer to be initially distributed prior to sintering in order to obtain a desired thickness after compression.

A method for sintering metal powders and simultaneously bonding them to various backing members is clearly disclosed in Koehring Patent No. 2,198,253, wherein the basic method for sintering various metal powder mixtures is disclosed and wherein said mixtures are initially sintered from substantially non-compacted metal.

The grid, as shown in Fig. 3, may be made in substantially the same manner except that the gridded surface is made in a mold formed from graphite or other suitable non-adhering material and wherein the backing member is set upon the powder during the sintering operation when a bond is desired. The entire assembly, after sintering, may be compressed to the desired porosity. It is understood in both cases that, if the porous metal part is not to be bonded to the ferrous member, the use of a graphite or other suitable material may be employed to provide a non-adhering receptacle or mold surface upon which powder may be sintered.

Molding of substantially non-compacted material is described in Koehring Patent No. 2,198,102. In all instances, it is desirable to compress the sintered layer to a degree for providing a substantially continuously operating surface interspersed with minute voids which will retain the grease.

In some cases, it may be desirable to actually compress the metal powder prior to the sintering operation whereby a less porous surface may be obtained which may or may not require a post sintering sizing operation. In this instance, the metal powder mixture to be used may be compressed in a die or between flat surfaces, according to the specific cross sectional shape thereof, under pressures ranging from 20,000 to 60,000 pounds per square inch for cohering the metal powder particles into a self-sustaining mass or sheet. This mass may be briquetted directly onto the surface of a skillet or the like if desired. In this case, it has been found desirable to flash-copperplate the surface to which the material is to be bonded. After compression, the part may be sintered under suitable conditions of time and temperature for forming the desired porous metal surface and, in certain cases, for bonding said surface directly to the backing member if desired. Numerous patent disclosures, directed to the compression or briquetting of metal powders, are available and, in this connection, the sintering temperatures and procedures used, whether the powder is compressed prior to sintering or after sintering, are substantially identical.

I specifically prefer to make the porous surface from a mixture of metal powders, for example, copper and nickel powders, wherein nickel makes up from about 40 to 60% of the mass and copper the remainder. This mixture may then be sintered at a temperature ranging from 2000° to 2050° F. which is sufficient to cause copper diffusion into the nickel for forming a copper-nickel alloy and for causing this alloy to bond directly to the backing member when desired. The sintering step should take place under controlled conditions of atmosphere, for example, in a non-oxidizing or reducing atmosphere and should be carried out over a time period ranging from 20 to 40 minutes. In the case of porous iron, the iron is preferably mixed with copper, up to 10% for example, and this mixture of powders may be sintered at a temperature in the order of 2000° to 2050° F. under controlled conditions for effecting a bonding of the particles together by the melting and partial alloying of the copper. If a briquetted article is to be made pure iron powder or iron alloy powder, it may be briquetted and sintered under similar conditions whereby the particles are firmly bonded together.

Copper-tin mixtures, wherein copper is used in approximately the ratio of nine times the weight of the tin, may be used and sintered at temperatures ranging from 1550° F. to 1700° F. under suitable conditions of time and temperature to form a bronze article to be formed.

Similarly, it is possible to form aluminum wear by a similar procedure. However, in this instance, the aluminum powder is preferably precompressed as by briquetting prior to the sintering operation in order to abrade adjacent particles for conditioning their surfaces to bond together. Sintering temperatures for aluminum must be below the melting point of the powder used, for example, from 900° F. to 975° F. Also conventional alloying ingredients may be present, when desired, for added strength. In fact, any suitable material may be used to form the porous metal portion of the cooking utensil wherein said material may be suitably sintered into a strong porous framework having the desired porosity wherein the metal utilized will not react with fat at the temperatures involved in cooking.

The use of a porous metal cooking surface in a skillet or the like provides a sponge-like structure having a relatively smooth surface which will soak up the grease by capillarity upon the melting thereof and which will constantly exude grease in a thin film as needed due to capillarity. Thus a single greasing during a cooking operation is generally sufficient to provide a non-sticking surface. The grease may be washed out of the porous metal surface through the use of a detergent or soap as desired either at the termination of the cooking operation or at the termination of several of such cooking operations. Similarly, the grease may be replaced during cooking operations as needed but at all times the use of the porous metal cooking surfaces will provide a controlled quantity of grease thereover through the capillary action of the porous material.

It is apparent that the solid metal portion of the utensil may be made from iron, alloys of iron, steel, copper, stainless steel, nickel, etc., it being pointed out, however, that the solid metal portion limits the use of metal powders where simultaneous bonding is desired to those metals that may be sintered at temperatures below the melting point of the solid metal portion.

While the embodiments of the present invention as herein disclosed, constitute preferred forms, it is to be understood that other forms might be adopted.

What is claimed is as follows:

1. A frying pan comprising in combination; a dish-shaped solid metal pan comprising a relatively upright cylindrical wall bounding a relatively horizontal bottom wall which is adapted to contact a heating means at one side thereof, said bottom wall including at its other side a coextensive cooking surface layer of sintered porous metal of substantial depth metallurgically and coextensively bonded thereto and having pores therein which extend entirely therethrough, said porous metal layer being capable of retaining and exuding fatty ingredients, said porous metal layer being within said cylindrical wall and providing a cooking surface of uniform heat conductivity throughout.

2. A waffle iron comprising in combination, two members adapted to be used in juxtaposed relation and capable of being separated from one another, each of said members comprising a solid metal portion having a heating element in heat conducting relation with one side thereof and a sintered porous metal grid in heat conducting relation with the other side thereof, each of said sintered porous metal grids being of substantial depth and including pores which extend entirely therethrough, said sintered porous metal grids being capable of retaining and exluding fatty ingredients when heated by said heating elements, said grids being substantially aligned with one another when the two members are in juxtaposed relation.

References Cited in the file of this patent

UNITED STATES PATENTS

| | | |
|---|---|---|
| 310,500 | Egells | Jan. 6, 1885 |
| 721,455 | Mackenzie | Feb. 24, 1903 |
| 754,310 | Horine | Mar. 8, 1904 |
| 1,214,486 | Wright | Jan. 30, 1917 |
| 1,555,484 | Rosenberg | Sept. 29, 1925 |
| 1,879,212 | Hainlen | Sept. 27, 1932 |
| 2,081,164 | Bersted | May 25, 1937 |
| 2,171,040 | Merritt et al. | Aug. 29, 1939 |
| 2,184,828 | Woodman | Dec. 26, 1939 |
| 2,190,237 | Koering | Feb. 13, 1940 |
| 2,337,588 | Calkins | Dec. 28, 1943 |
| 2,496,705 | Farr et al. | Feb. 7, 1950 |
| 2,517,584 | Mapes | Aug. 8, 1950 |
| 2,534,407 | Bramberry | Dec. 19, 1950 |
| 2,618,258 | Kroyer | Nov. 18, 1952 |

FOREIGN PATENTS

| | | |
|---|---|---|
| 556,065 | Great Britain | Sept. 17, 1943 |